United States Patent
Wu et al.

(10) Patent No.: US 7,338,819 B2
(45) Date of Patent: Mar. 4, 2008

(54) SYSTEM AND METHOD FOR MATCHING CHIP AND PACKAGE TERMINALS

(75) Inventors: Yung-Wen Wu, Saratoga, CA (US); Chiping Ju, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 432 days.

(21) Appl. No.: 11/173,357

(22) Filed: Jun. 30, 2005

(65) Prior Publication Data

US 2007/0004060 A1    Jan. 4, 2007

(51) Int. Cl.
   *H01L 21/66* (2006.01)
(52) U.S. Cl. .................... 438/15; 438/16; 438/108
(58) Field of Classification Search .............. 438/7, 438/14–18, 108, 455
   See application file for complete search history.

(56) References Cited

U.S. PATENT DOCUMENTS

| | | | |
|---|---|---|---|
| 4,490,811 A | | 12/1984 | Yianilos et al. |
| 5,694,482 A | * | 12/1997 | Maali et al. ............... 382/151 |
| 6,684,402 B1 | * | 1/2004 | Wolff ......................... 725/105 |
| 6,900,459 B2 | * | 5/2005 | Farnworth et al. ............ 438/15 |
| 7,071,078 B2 | * | 7/2006 | Reeder et al. .............. 438/455 |

FOREIGN PATENT DOCUMENTS

| | | |
|---|---|---|
| JP | 04279973 B1 | 10/1992 |
| WO | WO 2004/079631 B2 | 9/2004 |

* cited by examiner

*Primary Examiner*—Kevin M. Picardat
(74) *Attorney, Agent, or Firm*—McAndrews, Held & Malloy, Ltd.

(57) ABSTRACT

A system and method for matching chip and package terminals and for packaging integrated circuits. Various aspects of the present invention may comprise receiving as input a first list of chip terminal identifiers and a second list of package terminal identifiers. The first and second lists may be analyzed with a first string-matching algorithm to determine a first set of matching pairs of chip terminals and package terminals. The first and second lists may also be analyzed with a second string-matching algorithm to determine a second set of matching pairs of chip terminals and package terminals. The first and second sets of matching pairs may be compared to identify common matching pairs between the first and second sets of matching pairs. An indication of the common matching pairs may then be output.

25 Claims, 4 Drawing Sheets

SYSTEM AND METHOD FOR MATCHING CHIP AND PACKAGE TERMINALS

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In integrated circuit production, a semiconductor chip is generally encapsulated in a sealed package, which includes leads with which the integrated circuit may be soldered to a printed wire board. Within the package, terminals of the semiconductor chip may be bonded to corresponding terminals within the package.

During integrated circuit production, a semiconductor chip may have a corresponding list of terminals, which may in turn be identified by any of a variety of identifiers (e.g., identification strings). Similarly, the integrated circuit package may have a corresponding list of terminals, which may in turn be identified by any of a variety of identifiers (e.g., identification strings). To properly bond a semiconductor chip to an integrated circuit package, terminals of the semiconductor chip should be bonded to the correct corresponding terminals of the integrated circuit package. Often, the list of terminals associated with a semiconductor chip and the list of terminals associated with an integrated circuit package are not identical, resulting in time-consuming and error-prone manual matching of terminal identifiers.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for matching chip and package terminals and for packaging integrated circuits, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
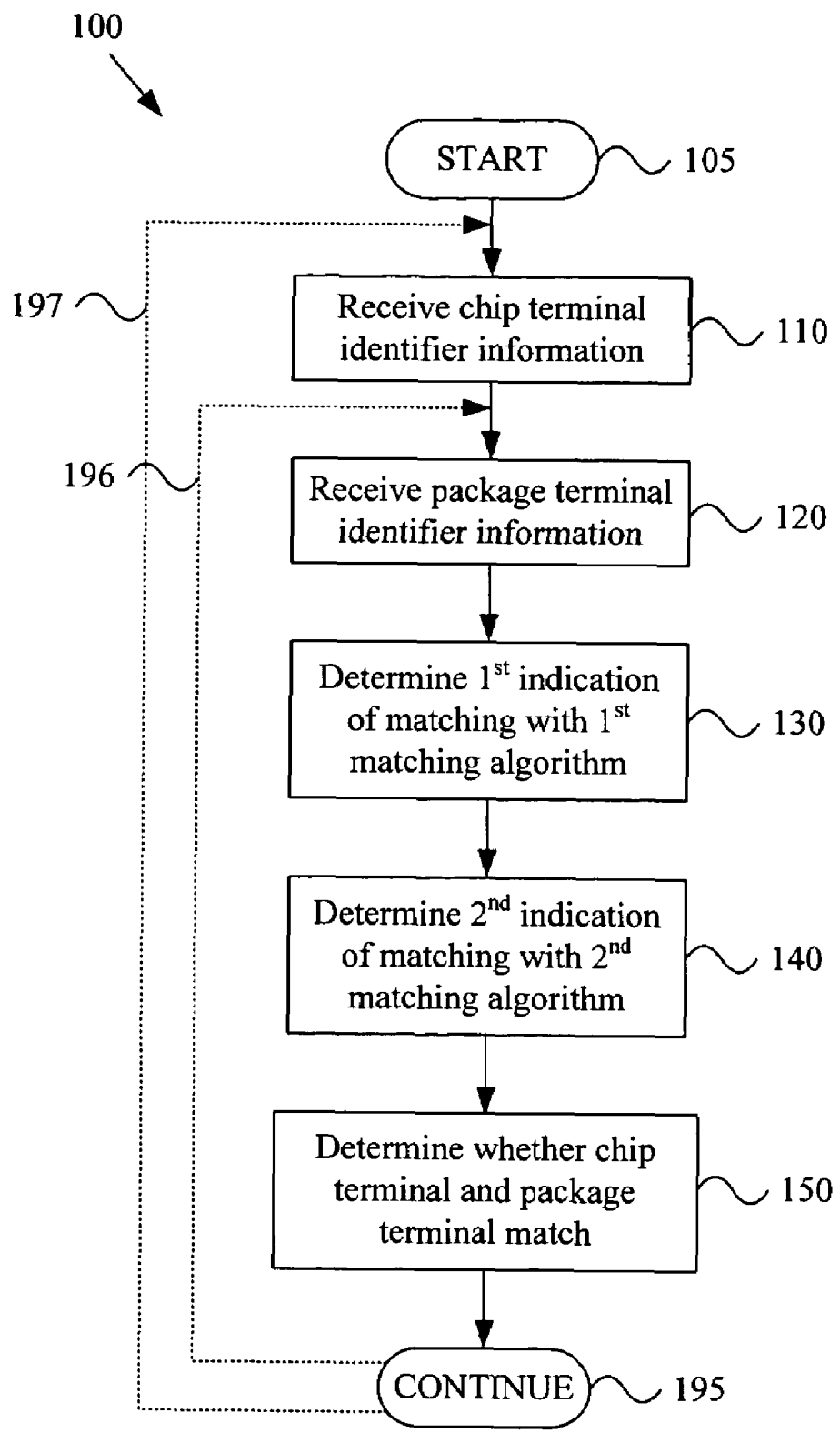
FIG. 1 is a diagram illustrating a method for matching chip and package terminals, in accordance with various aspects of the present invention.

FIG. 1 is a diagram illustrating a method 100 for matching chip and package terminals, in accordance with various aspects of the present invention. The method 100 (and all methods discussed herein) may, for example, be implemented during the packaging of any of a large variety of circuits (e.g., integrated circuits). For example, the method 100 may be implemented during the packaging of analog, digital or hybrid circuitry. Also for example, the method 100 may be implemented during the packaging of microprocessors, signal processors, decoders, communication circuits, audio/video encoders/decoders, power supply circuits, user interface circuits, memory circuits, etc. Accordingly, the scope of various aspects of the present invention should not be limited by characteristics of any particular type of circuit that might be packaged utilizing the exemplary method 100.

The exemplary method 100 (and all methods discussed herein) may be implemented in any of a variety of systems. For example and without limitation, the exemplary method 100 may be implemented in an integrated circuit packaging system, computer workstation, CAD system, processor core of a distributed system, etc. The exemplary method 100 may, for example, be performed by a processor executing software instructions. Such software instructions may, for example, reside in any of a variety of computer readable media.

Note that the exemplary method 100 will be generally discussed in the context of matching a single chip terminal identifier and a single package terminal identifier. Such scope was chosen for illustrative clarity and should by no means limit the scope of various aspects of the present invention to characteristics of matching a single chip terminal identifier and a single package terminal identifier. For example, aspects of the exemplary method 100 may be readily extended to matching one or more of a plurality of chip terminal identifiers to one or more of a plurality of package terminal identifiers. A non-limiting illustration of such extension will be discussed later with regard to FIG. 2.

The exemplary method 100 may begin executing at step 105. The exemplary method 100 (and other methods discussed herein) may begin executing for any of a variety of reasons. For example and without limitation, the exemplary method 100 may begin executing in response to a user or system command to begin. Also for example, the exemplary method 100 may begin executing in response to the arrival of information (e.g., chip and/or package terminal information) at a system implementing the exemplary method 100. Accordingly, the scope of various aspects of the present invention should not be limited by characteristics of any particular initiating cause or condition.

The exemplary method 100 may, at step 110, comprise receiving information of a chip terminal identifier (e.g., a chip pad identifier). Such a chip terminal identifier may comprise characteristics of any of a variety of identifier types. For example and without limitation, a chip terminal identifier may comprise characteristics of a text string (e.g., alphabetic, numeric or alphanumeric). The scope or various aspects of the present invention should not be limited by characteristics of any particular chip terminal identifier.

Step 110 may comprise receiving the chip terminal identifier in any of a variety of manners. For example and without limitation, step 110 may comprise receiving and/or retrieving the chip terminal identifier from a text file or other computer data file. Step 110 may, for example, comprise retrieving the chip terminal identifier from a database. Step 110 may also, for example, comprise receiving the chip terminal identifier via user input. Step 110 may additionally, for example, comprise receiving the chip terminal identifier from a local data source or a networked data source. For example, step 110 may comprise receiving the chip terminal identifier from a chip design system and/or computer aided design (CAD) system. Such a system may, for example, correspond to a manufacturer or distributor of the integrated circuit chip. Accordingly, the scope of various aspects of the present invention should not be limited by characteristics of any particular manner of receiving chip terminal identifier information.

The exemplary method 100 may, at step 120, comprise receiving information of a package terminal identifier (e.g., a package ball identifier). As with the chip terminal identifier discussed previously, such a package terminal identifier may comprise characteristics of any of a variety of identifier types. For example and without limitation, a package terminal identifier may comprise characteristics of a text string (e.g., alphabetic, numeric or alphanumeric). The scope or various aspects of the present invention should not be limited by characteristics of any particular package terminal identifier.

Step 120 may comprise receiving the package terminal identifier in any of a variety of manners. For example and without limitation, step 120 may comprise receiving and/or retrieving the package terminal identifier from a text file or other computer data file. Step 120 may, for example, comprise retrieving the package terminal identifier from a database. Step 120 may also, for example, comprise receiving the package terminal identifier via user input. Step 120 may additionally, for example, comprise receiving the package terminal identifier from a local data source or a networked data source. For example, step 120 may comprise receiving the package terminal identifier from a package design system and/or computer aided design (CAD) system. Such a system may, for example, correspond to a manufacturer or distributor of the integrated circuit package. Accordingly, the scope of various aspects of the present invention should not be limited by characteristics of any particular manner of receiving package terminal identifier information.

The exemplary method 100 may, at step 130, comprise utilizing a first matching algorithm to determine a first indication of matching between the chip terminal identifier (e.g., as received at step 110) and the package terminal identifier (e.g., as received at step 120). The first matching algorithm may comprise characteristics of any of a variety of types of matching algorithms.

For example and without limitation, the first matching algorithm may comprise characteristics of a string-matching algorithm based, at least in part, on matching strings by performing string modifications. For example, in a non-limiting exemplary scenario, step 130 may comprise matching the chip terminal identifier and the package terminal identifier by modifying at least one of the chip terminal identifier and the package terminal identifier and determining the extent of such modification. For example, step 130 may comprise determining a minimum amount of such modification necessary to match the chip terminal identifier and the package terminal identifier. Such a minimum amount of modification may, for example, be indicative of how close the chip terminal identifier is to the package terminal identifier.

In a non-limiting exemplary scenario, step 130 may comprise associating respective costs with various string modification operations (e.g., text substitution, insertion and/or deletion operations). For example and without limitation, in a non-limiting exemplary scenario, step 130 may comprise associating a cost of 3 with a text substitution operation, a cost of 1 with a text insertion operation, and a cost of 1 with a text deletion operation. Step 130 may then, for example, comprise performing any of a variety of combinations of the various string modification operations while accumulating the respective costs of the operations.

For example, in the non-limiting exemplary scenario, step 130 may comprise performing a text substitution operation and three text deletion operations to match the chip terminal identifier and the package terminal identifier, which results in a matching cost of 6 (e.g., 3+1+1+1). Continuing the non-limiting exemplary scenario, step 130 may comprise performing two text insertion operations and one text deletion operation to match the chip terminal identifier and the package terminal identifier, which results in a matching cost of 3 (e.g., 1+1+1). Continuing the non-limiting exemplary scenario, step 130 may comprise performing two text substitution operations and a text deletion operation to match the chip terminal identifier and the package terminal identifier, which results in a matching cost of 7 (e.g., 3+3+1).

Step 130 may then, for example, comprise determining the lowest matching cost required to match the chip terminal identifier and the package terminal identifier. Continuing the non-limiting exemplary scenario, step 130 may comprise determining a least matching cost of 3 for matching the chip terminal identifier and the package terminal identifier. Such a lowest matching cost may be indicative of how closely the chip terminal identifier matches the package terminal identifier.

Step 130 may be implemented in any of a variety of manners. For example and without limitation, step 130 may be implemented utilizing dynamic programming and string manipulation to determine matching cost. In general, step 130 may be implementing using any of a variety of algorithms (e.g., known or yet to be developed matching algorithms), non-limiting examples of which might be found in Skiena, "The Algorithm Design Manual," published Nov. 14, 1997 by Springer, ISBN 0387948600, and in Cormen et al., "Introduction to Algorithms," Second Edition, published Sep. 1, 2001 by MIT Press, ISBN 0262032937, each of which are hereby incorporated herein in their entirety by reference.

The exemplary method 100 may, at step 140, comprise utilizing a second matching algorithm to determine a second indication of matching between the chip terminal identifier (e.g., as received at step 110) and the package terminal identifier (e.g., as received at step 120). The second matching algorithm may, for example, be substantially different from the first matching algorithm utilized at step 130.

The second matching algorithm may, for example, comprise identifying substrings of the chip terminal identifier and the package terminal identifier that match. Then the second matching algorithm may, for example, comprise determining (e.g., based on the identified substrings) a portion of the chip terminal identifier and the package terminal identifier that match.

The second matching algorithm may, for example and without limitation, comprise characteristics of a minimum common string partitioning (MCSP) algorithm. In a non-limiting exemplary scenario, step 140 may comprise identifying substrings of the chip terminal identifier and the package terminal identifier that match. For example and without limitation, in the non-limiting exemplary scenario, step 140 may comprise implementing a greedy algorithm (e.g., searching for matching algorithms starting at a largest substring length and then incrementally decreasing substring length eventually to a single character). Step 140 may then, for example, comprise determining a portion of the chip terminal identifier and/or the package terminal identifier that includes the matching substrings. Such a portion may, for example, be indicative of a matching rate between the chip terminal identifier and the package terminal identifier.

In a non-limiting exemplary scenario, step 140 may comprise determining that the chip terminal identifier and the package terminal identifier include matching substrings of length 4, 2 and 1, while the total length of the chip terminal identifier and/or the package terminal identifier is 10. Step 140 may then determine a matching rate of (4+2+1)/10=0.7. In another non-limiting exemplary scenario, step 140 may comprise determining that the chip terminal identifier and the package terminal identifier include matching substrings of length 3 and 2, while the total length of the chip terminal identifier and/or the package terminal identifier is 8. Step 140 may then determine a matching rate of (3+2)/8=0.625.

Step 140 may be implemented in any of a variety of manners. For example and without limitation, step 140 may be implemented utilizing a greedy algorithm and MCSP to determine matching rate. In general, step 140 may be implementing using any of a variety of algorithms (e.g., known or yet to be developed algorithms), non-limiting examples of which might be found in Skiena, "The Algorithm Design Manual," published Nov. 14, 1997 by Springer, ISBN 0387948600, and in Cormen et al., "Introduction to Algorithms," Second Edition, published Sep. 1, 2001 by MIT Press, ISBN 0262032937, each of which are hereby incorporated herein in their entirety by reference.

The exemplary method 100 may, at step 150, comprise determining, based at least in part on the first indication of matching (e.g., as determined at step 130) and the second indication of matching (e.g., as determined at step 140), whether the chip terminal identifier corresponds to the package terminal identifier. Step 150 may comprise making such a determination in any of a variety of manners, characteristics thereof may, for example, depend on characteristics of algorithms utilized in previous steps.

For example and without limitation, step 150 may comprise determining whether the indication of matching (e.g., as determined at step 130) indicates that the package terminal identifier is the most likely match to the chip terminal identifier. For example, such determination may comprise comparing the first indication of matching (e.g., matching cost) between the chip terminal identifier and the package terminal identifier to respective first indications of matching (e.g., respective matching costs) between the chip terminal identifier and other package terminal identifiers. Such comparison may, for example, comprise determining whether such respective first indications of matching indicate that there is a higher degree of matching (e.g., lower matching cost) between the chip terminal identifier and the package terminal identifier than between the chip terminal identifier and other package terminal identifiers.

Step 150 may also, for example, comprise determining whether the second indication of matching (e.g., as determined at step 140) indicates that the package terminal identifier is the most likely match to the chip terminal identifier. For example, such determination may comprise comparing the second indication of matching (e.g., matching rate) between the chip terminal identifier and the package terminal identifier to respective second indications of matching (e.g., respective matching rates) between the chip terminal identifier and other package terminal identifiers. Such a comparison may, for example, comprise determining whether such respective second indications of matching indicate that there is a higher degree of matching (e.g., higher matching rate) between the chip terminal identifier and the package terminal identifier than between the chip terminal identifier and other package terminal identifiers.

Step 150 may, for example, if the first indication of matching and second indication of matching both indicate that the package terminal identifier is the most likely match to the chip terminal identifier, comprise determining that the chip terminal identifier and the package terminal identifier are a matching pair (or, e.g., a most likely matching pair).

In a non-limiting exemplary scenario, the first indication of matching (e.g., as determined at step 130) comprises matching cost and the second indication of matching (e.g., as determined at step 140) comprises matching rate. Step 150 may then, for example, comprise determining whether the matching cost indicates that the chip terminal identifier and the package terminal identifier are a matching pair (e.g., the pair has the lowest respective matching cost), and determining whether the matching rate indicates that the chip terminal identifier and the package terminal identifier are a matching pair (e.g. the pair has the highest respective matching rate). Continuing the non-limiting exemplary scenario, step 150 may then, for example if the matching cost and matching rate indicate that the package terminal identifier is the most likely match to the chip terminal identifier, comprise determining that the chip terminal identifier and the package terminal identifier are a matching pair (or, for example, a most likely matching pair).

The exemplary method 100 may, at step 195, comprise performing continued processing. Such continued processing may comprise characteristics of any of a large variety of types of continued processing. For example and without limitation, if it is determined at step 150 that the first string-matching algorithm and the second string-matching algorithm agree that the chip terminal identifier corresponds to the package terminal identifier, then step 195 may comprise outputting an indication that the chip terminal identifier corresponds to the package terminal identifier.

Also for example, if it is determined at step 150 that the first matching algorithm and second matching algorithm do not agree whether the chip terminal identifier corresponds to the package terminal identifier, then step 195 may comprise outputting an indication that the chip terminal identifier and the package terminal identifier might not correspond to a matching pair. Step 195 may also, for example, comprise outputting an indication of at least one of: matching cost (e.g., as might be determined at step 130) and matching rate (e.g., as might be determined at step 140).

Further for example, if it is determined that the first matching algorithm and second matching algorithm do not agree whether the chip terminal identifier corresponds to the package terminal identifier, then step 195 may comprise determining a most likely matching package terminal identifier for the chip terminal identifier and outputting an indication of such a likely matching package terminal identifier.

Still further for example, step 195 may comprise directing execution flow of the exemplary method 100 back up to step 120 for receiving a next package terminal identifier to process with the chip terminal identifier (e.g., along dashed line 196). Yet further for example, step 195 may comprise directing execution flow of the exemplary method 100 back up to step 110 for receiving a next chip terminal identifier and continued processing of the next chip terminal identifier with package terminal identifiers. In general, step 195 may comprise performing any of a large variety of continued processing. Accordingly, the scope of various aspects of the present invention should not be limited by characteristics of any particular type of continued processing.

The exemplary method 100 was presented to provide illustrative examples of a portion of generally broader aspects of the present invention. Accordingly, the scope of various aspects of the present invention should not be limited by characteristics of the exemplary method.

Figure 2:
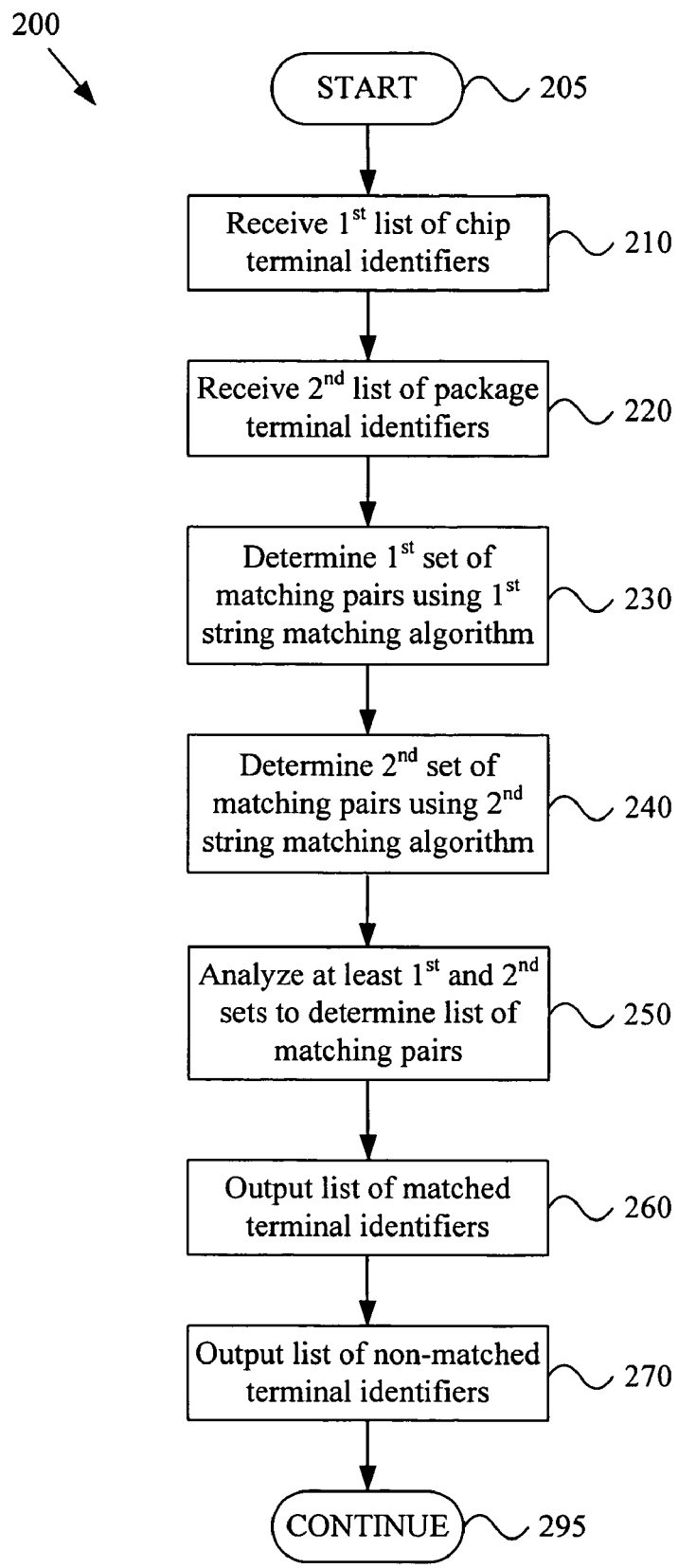
FIG. 2 is a diagram illustrating a method for matching chip and package terminals, in accordance with various aspects of the present invention.

FIG. 2 is a diagram illustrating a method 200 for matching chip and package terminals, in accordance with various aspects of the present invention. The exemplary method 200 may, for example and without limitation, share various characteristics with the exemplary method 100 illustrated in FIG. 1 and discussed previously.

The exemplary method 200 may, at step 210, comprise receiving as input a first list of terminal identifiers (e.g., chip terminal (or pad) identifiers). Step 210 may, for example and without limitation, share various characteristics with step 110 of the exemplary method 100.

As discussed previously with regard to FIG. 1, a chip terminal identifier may comprise any of a variety of identifier characteristics. For example and without limitation, a chip terminal identifier may comprise characteristics of an alphabetic, numeric or alphanumeric chip terminal identifier. Though the following discussion may generally refer to the first list as a list of chip terminal identifiers, the scope of various aspects of the present invention should not be limited by characteristics of a particular type of terminal identifier (e.g., chip terminal identifiers).

The first list may comprise characteristics of any of a variety of list types. For example and without limitation, the first list may comprise characteristics of a text file. Also for example, the first list may comprise characteristics of identifier entries in a database, manually input identifier entries, a computer list data structure including identifier entries, a digital stream of identifier information, an email message, etc. The scope of various aspects of the present invention should not be limited by characteristics of a particular identifier type or list type.

Step 210 may comprise receiving the first list in any of a variety of manners. For example and without limitation, step 210 may comprise receiving the first list as a computer file communicated over a computer communication network (e.g., wired or wireless network). Also for example, step 210 may comprise retrieving the first list from a computer readable media (e.g., a CD, DVD, computer hard drive, optically scanned media, etc.). Further for example, step 210 may comprise receiving the first list from a database, networked chip design system, chip manufacturer or distributor information system, etc.). Accordingly, the scope of various aspects of the present invention should not be limited by characteristics of any particular manner of receiving an identifier list.

The exemplary method 200 may, at step 220, comprise receiving a second list of terminal identifiers (e.g., package terminal (or ball) identifiers). Step 220 may, for example and without limitation, share various characteristics with step 120 of the exemplary method 100. Step 220 may also, for example, share various characteristics with step 210.

As discussed previously with regard to FIG. 1, a package terminal identifier may comprise any of a variety of identifier characteristics. For example and without limitation, a package terminal identifier may comprise characteristics of an alphabetic, numeric or alphanumeric package terminal identifier. Though the following discussion may generally refer to the second list as a list of package terminal identifiers, the scope of various aspects of the present invention should not be limited by characteristics of a particular type of terminal identifier (e.g., package terminal identifiers).

As with the first list received at step 210, the second list may comprise characteristics of any of a variety of list types. For example and without limitation, the second list may comprise characteristics of a text file. Also for example, the second list may comprise characteristics of identifier entries in a database, manually input identifier entries, a computer list data structure including identifier entries, a digital stream of identifier information, an email message, etc. The second list may, for example and without limitation, be a portion of a composite list that also comprises the first list received at step 210. The scope of various aspects of the present invention should not be limited by characteristics of a particular identifier type or list type.

Step 220 may comprise receiving the second list in any of a variety of manners. For example and without limitation, step 220 may comprise receiving the second list as a computer file communicated over a computer communication network (e.g., wired or wireless). Also for example, step 220 may comprise retrieving the second list from a computer readable media (e.g., a CD, DVD, computer hard drive, optically scanned media, etc.). Further for example, step 220 may comprise retrieving the second list from a database, networked chip design system, chip manufacturer or distributor information system, etc.). Step 220 may, for example, comprise receiving the second list from the same source as the first list (e.g., as received at step 210) or from a different source. Accordingly, the scope of various aspects of the present invention should not be limited by characteristics of any particular manner of receiving an identifier list.

The exemplary method 200 may, at step 230, comprise analyzing the first and second lists (e.g., as received at steps 210 and 220) with a first string-matching algorithm to determine a first set of matching pairs of chip terminals and package terminals. Step 230 may, for example and without limitation, share various characteristics with step 130 of the exemplary method 100.

For example, step 230 may comprise analyzing the first and second lists utilizing a string-matching algorithm that matches chip terminal identifiers and package terminal identifiers by performing string modifications on at least one of the chip terminal identifiers and the package terminal identifiers. Step 230 may then, for example, comprise determining the extent of the modification performed to match the chip terminal identifiers and the package terminal identifiers, and identifying pairs of chip terminal identifiers and package terminal identifiers that correspond to a lowest extent of identifier modification.

In a non-limiting exemplary scenario, step 230 may comprise analyzing the first and second lists utilizing a string-matching algorithm that associates respective costs with text substitution, insertion and/or deletion. Step 230 may then, for example, comprise matching chip terminal identifiers from the first list and package terminal identifiers from the second list by performing any of such text substitution, insertion and/or deletion operations. Step 230 may then, for example, comprise accumulating the costs associated with performing the text substitution, insertion and/or deletion operations to determine a matching cost for a particular set of text modification operations. The previous discussion of step 130 of the exemplary method 100 included non-limiting examples of various matching cost determinations.

Step 230 may, for example, comprise identifying matching pairs of corresponding terminal identifiers from the first and second lists. For example, step 230 may comprise identifying pairs of chip and package terminal identifiers from the first and second lists that have respective lowest matching costs. As a non-limiting example, step 230 may comprise determining a plurality of respective matching costs corresponding to a chip terminal identifier from the first list and a plurality of package terminal identifiers from the second list. Step 230 may then, for example, comprise determining which of the package terminal identifiers resulted in the lowest matching cost for the chip terminal identifier, and determine such package terminal identifier and the first chip terminal identifier to be a matching pair (or, for example, the most likely matching pair).

As discussed previously with regard to step 130 of the exemplary method 100, step 230 may be implemented in any of a variety of manners. For example and without limitation, step 230 may comprise analyzing the first and second lists with a first string-matching algorithm that comprises utilizing dynamic programming with string manipulating to determine respective matching costs for pairs of chip terminal identifiers and package terminal identifiers.

In general, step 230 may comprise analyzing the first and second lists with a first string-matching algorithm to determine a first set of matching pairs of chip terminals and package terminals. Accordingly, the scope of various aspects of the present invention should not be limited by characteristics of any particular string-matching algorithm.

The exemplary method may, at step 240, comprise analyzing the first and second lists with a second string-matching algorithm to determine a second set of matching pairs of chip terminals and package terminals. Step 240 may, for example and without limitation, share various characteristics with step 140 of exemplary method 100. The second string-matching algorithm may, for example, be substantially different than the first string-matching algorithm utilized at step 230 (e.g., determining string matching based on a substantially different matching theory).

Step 240 may, for example, comprise analyzing the first and second lists utilizing a string-matching algorithm that identifies matching substrings of the terminal identifiers of the first list (e.g., chip terminal identifiers) and terminal identifiers of the second list (e.g., package terminal identifiers). Step 240 may then, for example, comprise determining respective matching rates for pairs of identifiers (e.g., for pairs including a chip terminal identifier from the first list and a package terminal identifier from the second list), where a matching rate for such a pair may be based on a portion of a terminal identifier from the first list (e.g., a chip terminal identifier) and a terminal identifier from the second list (e.g., a package terminal identifier) that corresponds to one or more matching substrings. Step 140 may then, for example, comprise identifying matching pairs of terminal identifiers from the first list (e.g., chip terminal identifiers) and terminal identifiers from the second list (e.g., package terminal identifiers) by identifying pairs of terminal identifiers from the first list and terminal identifiers from the second list with the highest matching rates. The previous discussion of step 140 of the exemplary method 100 included non-limiting examples of various matching rate determinations.

In a non-limiting exemplary scenario, step 240 may comprise utilizing a minimum common string partition algorithm to identify matching substrings of chip terminal identifiers from the first list and package terminal identifiers from the second list. Step 240 may then, for example, comprise determining respective matching rates for pairs of chip terminal identifiers and package terminal identifiers based, at least in part, on the identified matching substrings. Step 240 may then, for example, comprise identifying matching pairs of chip terminal identifiers and package terminal identifiers by identifying pairs of chip terminal identifiers and package terminal identifiers with the highest matching rates.

As discussed previously with regard to step 140 of the exemplary method 100, step 240 may be implemented in any of a variety of manners. For example and without limitation, step 240 may comprise analyzing the first and second lists with a second string-matching algorithm that comprises characteristics of a greedy algorithm and MCSP.

In general, step 240 may comprise analyzing the first and second lists with a second string-matching algorithm to determine a second set of matching pairs of chip terminals and package terminals. Accordingly, the scope of various aspects of the present invention should not be limited by characteristics of any particular string-matching algorithm.

The exemplary method 200 may, at step 250, comprise analyzing the first and second sets of matching pairs to determine a third set of matching pairs. For example and without limitation, step 250 may share various characteristics with step 150 of the exemplary method 100 illustrated in FIG. 1 and discussed previously. Such a third set of matching pairs may, for example and without limitation, comprise a list of pairs of chip terminals and package terminals that match to a relatively high degree of confidence (e.g., a degree of confidence that is higher than a respective degree of confidence associated with just one of the first and second string-matching algorithms).

Step 250 may, for example and without limitation, comprise comparing the first and second sets of matching pairs to identify common matching pairs between the first and second sets of matching pairs. For example, consider a non-limiting exemplary scenario where step 230 determined a first set of matching pairs of chip and package terminals (e.g., based on a relatively lowest matching cost) that includes a first matching pair, and step 240 determined a second set of matching pairs of chip and package terminals (e.g., based on a relatively highest matching rate) that includes a second matching pair that includes the same chip and package terminals as the first matching pair). In the non-limiting exemplary scenario step 250 may comprise determining that the first matching pair (e.g., as determined at step 230) and the second matching pair (e.g., as determined at step 240) represent the same pair of chip and package terminals and are thus common to both the first and second sets. In such a case, step 250 may, for example, place the identified common pair in a third list (e.g., a list of common pairs) that comprises chip and package terminal matching pairs for which step 230 and step 240 agree.

The exemplary method 200 may, at step 260, comprise outputting an indication of matching pairs of terminals (e.g., chip and package terminal pairs) for which step 230 and step 240 agree. An indication of matching pairs of terminals may comprise any of a variety of characteristics. For example and without limitation, an indication of matching pairs of terminals may comprise characteristics of a list of pairs of terminal identifiers (e.g., a two-column list with chip terminal identifiers in a first column and a corresponding list of package terminal identifiers in a second column). Also for example, an indication of matching pairs may comprise a table, array or linked list of data structures comprising information of such pairs of terminal identifiers.

Step 260 may comprise outputting such an indication of matching pairs of terminals in any of a variety of manners. For example and without limitation, step 260 may comprise generating a computer file comprising information of the matching terminal pairs. Such a computer file may, for example, be communicated to another system over a network or may, for example, be stored on a machine-readable medium. Further for example, step 260 may comprise outputting information of matching terminal pairs on a display device, printout or other human-perceivable media.

In general, step 260 may comprise outputting an indication of matching pairs of terminals (e.g., chip and package terminal pairs) for which step 230 and step 240 agree. Accordingly, the scope of various aspects of the present invention should not be limited by characteristics of any particular type of indication of matching pairs or by any particular manner of outputting such an indication of matching pairs.

The exemplary method 270 may, for example, comprise outputting an indication of terminals and/or matching pairs of terminals for which step 230 and step 240 do not agree (e.g., a portion of the first and second lists of terminals). For example and without limitation, step 270 may share various characteristics with step 260, albeit with regard to non-matching terminals and/or pairs of terminals.

In a non-limiting exemplary scenario, step 270 may comprise determining which matching pair of step 230 and step 240 is most likely the correct matching pair. Step 270 may, for example comprise outputting such information in a manner enabling another algorithm, a user or another system to perform further analysis on a potential matching pair. In another non-limiting exemplary scenario, step 270 may comprise outputting various analysis information from step 230 and step 240 (e.g., string matching cost and/or matching rate information).

The exemplary method 200 may, at step 295, comprise performing continued processing. Step 295 may, for example and without limitation, share various characteristics with step 195 of the exemplary method 100 illustrated in FIG. 1. Such continued processing may comprise characteristics of any of a large variety of types of continued processing.

For example and without limitation, as discussed later, step 295 may comprise utilizing the matching pair information from prior steps to couple (or bond) an integrated circuit chip to an integrated circuit package. Further for example, step 295 may comprise providing a user interface enabling a user to modify or specify terminal pairings. Still further for example, step 295 may comprise performing further analysis (e.g., string matching analysis) on the first and second lists. For example and without limitation, step 295 may comprise utilizing a third string-matching algorithm to generate further string matching information (e.g., for a user or system to utilize to perform further string matching analysis).

In a non-limiting exemplary scenario, step 295 may comprise applying rules to filter out pairs of chip terminals and package terminals that may not be matched (e.g., pairs that correspond to different voltage levels, signal directions, etc.). In such an exemplary scenario, step 295 may comprise directing execution flow back up to step 250 (or another analysis step) for further analysis.

In general, step 295 may comprise performing continued processing. Accordingly, the scope of various aspects of the present invention should not be limited by characteristics of any particular type of continued processing.

The exemplary method 200 was presented to provide illustrative examples of a portion of generally broader aspects of the present invention. Accordingly, the scope of various aspects of the present invention should not be limited by characteristics of the exemplary method 200.

Figure 3:
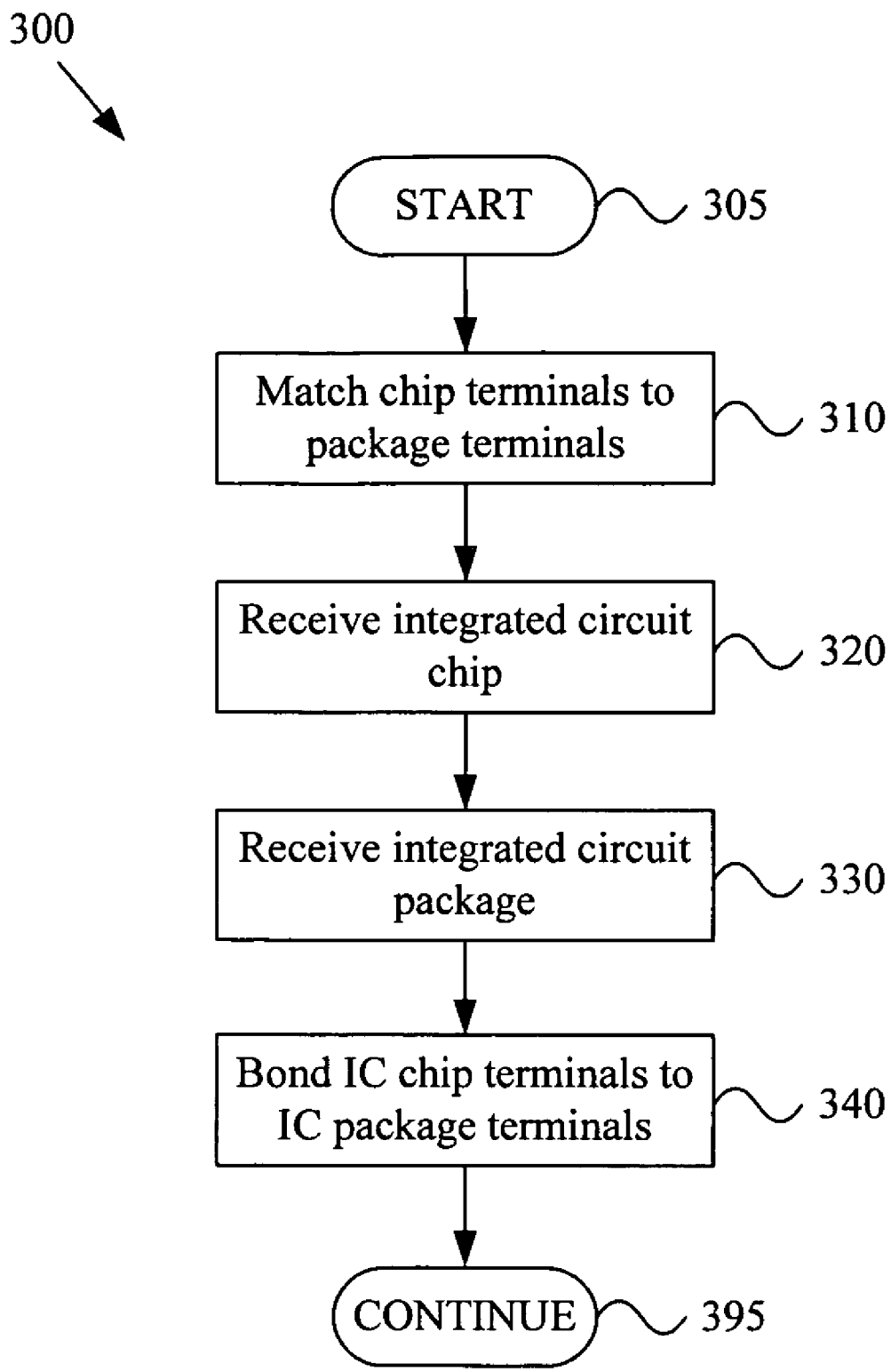
FIG. 3 is a diagram illustrating a method for packaging integrated circuits in accordance with various aspects of the present invention.

FIG. 3 is a diagram illustrating an exemplary method 300 for packaging integrated circuits in accordance with various aspects of the present invention. The exemplary method may, at step 310, comprise matching chip terminals (e.g., chip pads) to package terminals (e.g., package balls). Step 310 may, for example and without limitation, share various characteristics with any of, any combination of, or all of the steps of the exemplary methods 100, 200 illustrated in FIGS. 1-2 and discussed previously.

In a non-limiting exemplary scenario, step 310 may comprise receiving chip terminal information and package terminal information. Step 310 may then, for example, comprise processing the received terminal information with a plurality of matching algorithms. Step 310 may then, for example, comprise determining where the plurality of matching algorithms agree on matching terminal pairs and generate information of (e.g., a list of) such matching terminals pairs.

Continuing the non-limiting exemplary scenario, step 310 may also further process information of unmatched terminals. Such further processing may, for example, comprise utilizing an additional matching algorithm, filtering potentially matching terminal pairs by various rules, or soliciting user input regarding the matching of chip and package terminals.

The exemplary method 300 may, at step 320, comprise receiving integrated circuit chips to be packaged. Step 320 may comprise receiving such integrated circuit chips in any of variety of manners. The exemplary method 300 may, at step 330, comprise receiving integrated circuit packages with which to package the integrated circuit chips (e.g., as received at step 320). Step 330 may comprise receiving such integrated circuit packages in any of variety of manners.

The exemplary method 300 may, at step 340, comprise coupling (e.g., bonding) the integrated circuit chips (e.g., as received at step 320) to the integrated circuit packages (e.g., as received at step 330). Step 340 may, for example, comprise utilizing information of matching chip and package terminal pairs (e.g., as generated by step 320) to determine which chip terminals and package terminals to couple.

The exemplary method 300 was presented to provide illustrative examples of a portion of generally broader aspects of the present invention. Accordingly, the scope of various aspects of the present invention should not be limited by characteristics of the exemplary method 300.

Figure 4:
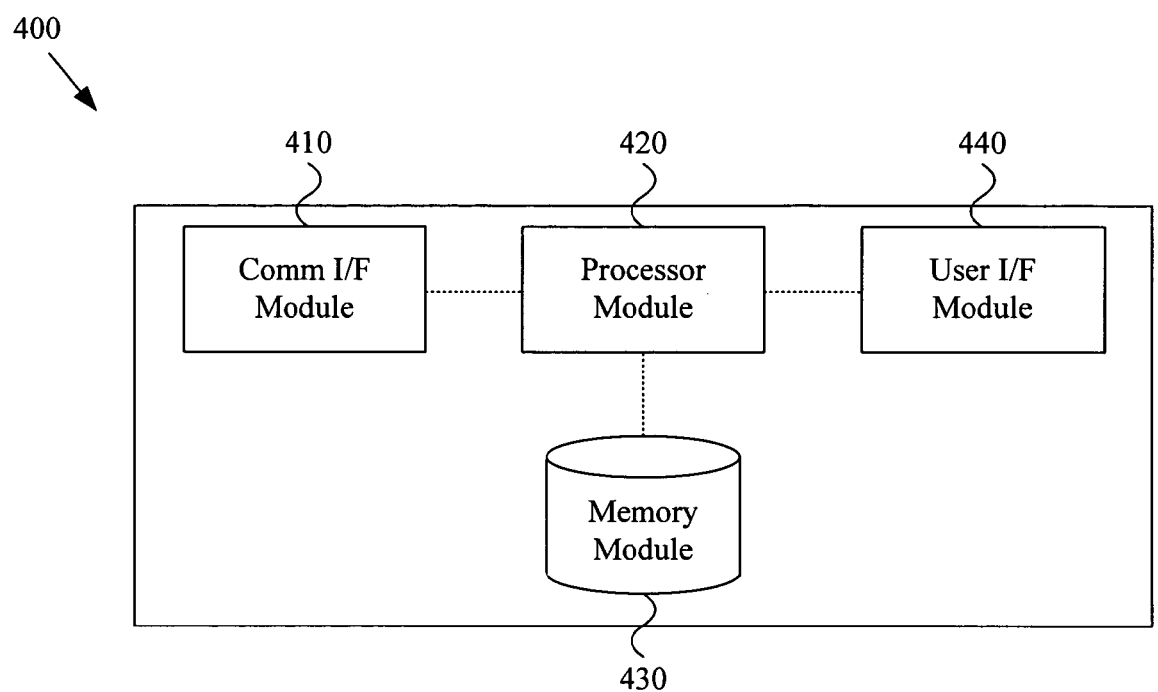
FIG. 4 is a diagram illustrating a system for matching chip and package terminals, in accordance with various aspects of the present invention.

FIG. 4 is a diagram illustrating a system 400 for matching chip and package terminals, in accordance with various aspects of the present invention. The exemplary system 400 may, for example and without limitation, share various functional characteristics with exemplary methods 100 and 200 illustrated in FIGS. 1-2 and discussed previously. The exemplary system 400 may comprise a communication interface module 410, a processor module 420, a memory module 430 and a user interface module 440.

The communication interface module 410 may be adapted to communicate information with devices or systems external to the exemplary system 400. The communication interface module 410 may, for example, share various functional characteristics with any of, any combination of, or all of steps 110, 120, 195, 210, 220, 260, 270 and/or 295 of the exemplary methods 100, 200 illustrated in FIGS. 1-2 and discussed previously. For example and without limitation, the communication interface module 410 may be adapted to communicate (e.g., transmit and/or receive) chip and/or package terminal information. Such information may, for example, comprise information of matched terminals or non-matched terminals.

The communication interface module 410 may, for example, be adapted to communicate such information in any of a variety of manners. For example, the communication interface module 410 may be adapted to communicate such information through a wired or wireless communication network (e.g., computer network, telecommunication network, television network, etc.). The scope of various aspects of the present invention should not be limited by characteristics of any particular type of information or any particular manner of, or mechanism for, communicating information.

The exemplary system 400 may comprise a memory module 430. The memory module 430 may comprise characteristics of any of a variety of memory types. For example and without limitation, the memory module 430 may comprise characteristics of a hard drive, CD or DVD reader/writer, diskette drive, thumb drive, volatile memory, non-volatile memory, random access memory, read-only memory, etc. The scope of various aspects of the present invention should not be limited by characteristics of any particular type of memory.

The memory module 430 may, for example, be utilized to read, write or store processing instructions. Such processing instructions may, for example and without limitation, comprise processing instructions that, when executed by a processor, cause the processor to perform the exemplary methods 100, 200 illustrated in FIGS. 1-2, or various aspects thereof. For example, the memory module 430 may be adapted to store software instructions that, when executed by a processor (e.g., the processor module 420), cause the processor to perform any of, any combination of, or all of the steps illustrated in FIGS. 1-2.

The memory module 430 may also, for example, be adapted to store input information, output information, and intermediate information. For example, the memory module 430 may be adapted to store terminal list information (e.g., chip terminal list information and/or package terminal list information). The scope of various aspects of the present invention should not be limited by characteristics of particular information that may be stored in a memory module 430.

The processor module 420 may, for example, be adapted to execute instructions (e.g., firmware or software instructions) to perform any of a large variety of operations. For example and without limitation, the processor module 420 may be adapted to execute instructions stored in the memory module 430 that, when executed, perform any of (or any portion of) the exemplary methods 100, 200 illustrated in FIGS. 1-2 and discussed previously.

The processor module 420 may comprise characteristics of any of a variety of processors. For example and without limitation, the processor module 420 may comprise characteristics of a CPU of a personal computer or workstation. Also, for example, the processor module 420 may comprise characteristics of a digital signal processor, microprocessor, microcontroller, UNIX system core, etc. The processor module 420 may, for example, comprise characteristics of a processor core of a system that bonds chip terminals to package terminals (e.g., a chip packing (or bonding) system). The scope of various aspects of the present invention should not be limited by characteristics of any particular type of processor.

The user interface module 440 may be adapted to interface with one or more users of the exemplary system 400. The user interface module 440 may, for example, be adapted to receive information from a user or transmit information to a user. For example and without limitation, the user interface module 440 may be adapted to receive information from a user related to chip and/or package terminals. Also for example, the user interface module 440 may be adapted to receive information from a user related to a particular chip and/or package. The user interface module 440 may be adapted to receive information from a user in any of a variety of manners. For example and without limitation, the user interface module 440 may be adapted to receive information from a keyboard, touchpad, touch screen, mouse, microphone, camera, scanner, etc.

Additionally for example, the user interface module 440 may be adapted to communicate (e.g., transmit) information to a user. For example and without limitation, the user interface module 440 may be adapted to communicate information of matching and/or non-matching terminal pairs to a user. Also for example, the user interface module 440 may be adapted to communicate information of matching terminal pair recommendations to a user. The user interface module 440 may be adapted to communicate information to a user in any of a variety of manners. For example and without limitation, the user interface module 440 may be adapted to transmit information to a user utilizing a display device, speaker device, printer, fax machine, etc.

In general, the user interface module 440 may be adapted to interface with one or more users of the exemplary system 400. Accordingly, the scope of various broader aspects of the present invention should not be limited by characteristics of any particular type of user interface.

The exemplary system 400 illustrated in FIG. 4 and discussed previously was presented to provide a non-limiting example of a portion of various aspects of the present invention. Accordingly, the scope of various aspects of the present invention should not be limited by particular characteristics of the exemplary system 400.

In summary, various aspects of the present invention provide a system and method for matching chip and package terminals. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method for matching integrated circuit chip terminals to package terminals, the method comprising:
   receiving as input a first list of chip terminal identifiers and a second list of package terminal identifiers;
   analyzing the first and second lists with a first string-matching algorithm to determine a first set of matching pairs of chip terminals and package terminals;
   analyzing the first and second lists with a second string-matching algorithm to determine a second set of matching pairs of chip terminals and package terminals;
   comparing the first and second sets of matching pairs to identify common matching pairs between the first and second sets of matching pairs; and
   outputting an indication of the common matching pairs.

2. The method of claim 1, wherein receiving as input a first list of chip terminal identifiers and a second list of package terminal identifiers comprises receiving a first computer file comprising the first list of chip terminal identifiers and a second computer file comprising the second list of package terminal identifiers.

3. The method of claim 1, wherein analyzing the first and second lists with a first string-matching algorithm comprises analyzing the first and second lists utilizing a string-matching algorithm that comprises:
   matching chip terminal identifiers and package terminal identifiers by performing string modifications on at least one of the chip terminal identifiers and the package terminal identifiers;
   determining extent of modification performed to match chip terminal identifiers and package terminal identifiers; and
   identifying pairs of chip terminal identifiers and package terminal identifiers that correspond to a lowest extent of identifier modification.

4. The method of claim 1, wherein analyzing the first and second lists with a first string-matching algorithm comprises analyzing the first and second lists utilizing a string-matching algorithm that comprises:
   associating respective costs with text substitution, insertion and/or deletion;
   matching chip terminal identifiers and package terminal identifiers by performing text substitution, insertion and/or deletion operations;
   accumulating matching costs associated with performing the text substitution, insertion and/or deletion operations; and
   identifying pairs of chip terminal identifiers and package terminal identifiers that correspond to a lowest matching cost.

5. The method of claim 1, wherein analyzing the first and second lists with a second string-matching algorithm comprises analyzing the first and second lists utilizing a string-matching algorithm that comprises:
   identifying matching substrings of the chip terminal identifiers and package terminal identifiers;
   determining respective matching rates for pairs of the chip terminal identifiers and package terminal identifiers, wherein a matching rate for a pair is based on a portion of the chip terminal identifier and package terminal identifier that corresponds to one or more of the identified matching substrings; and
   identifying matching pairs of the chip terminal identifiers and package terminal identifiers by identifying pairs of the chip terminal identifiers and package terminal identifiers with highest matching rates.

6. The method of claim 1, wherein analyzing the first and second lists with a second string-matching algorithm comprises analyzing the first and second lists utilizing a string-matching algorithm that comprises:
   utilizing a minimum common string partition algorithm to identify substrings of the chip terminal identifiers and package terminal identifiers;
   determining respective matching rates for pairs of chip terminal identifiers and package terminal identifiers based, at least in part, on the identified substrings; and
   identifying matching pairs of the chip terminal identifiers and package terminal identifiers by identifying pairs of the chip terminal identifiers and package terminal identifiers with highest matching rates.

7. The method of claim 1, wherein:
   analyzing the first and second lists with a first string-matching algorithm that comprises utilizing dynamic programming with string manipulating to determine respective matching costs for pairs of the chip terminal identifiers and package terminal identifiers; and
   analyzing the first and second lists with a second string-matching algorithm comprises utilizing a greedy algorithm with minimum common string partitioning to determine respective matching rates for pairs of chip terminal identifiers and package terminal identifiers.

8. The method of claim 1, wherein outputting an indication of the common matching pairs comprises generating a computer file comprising a list of the common matching pairs.

9. The method of claim 1, further comprising:
   identifying pairs of chip terminal identifiers and package terminal identifiers in the first and second lists that do not match;
   outputting an indication of the non-matching pairs.

10. The method of claim 9, further comprising determining which of the non-matching pairs is likely correct, and outputting an indication of which of the non-matching pairs is likely correct.

11. The method of claim 9, further comprising, for at least a portion of pairs of chip terminal identifiers and package terminal identifiers in the first and second lists that do not match, outputting indications of at least one of: matching cost and matching rate.

12. A method for matching integrated circuit chip terminals to package terminals, the method comprising:
   utilizing a first matching algorithm to determine a first indication of matching between a first chip terminal identifier and a first package terminal identifier;
   utilizing a second matching algorithm to determine a second indication of matching between the first chip terminal identifier and the first package terminal identifier;
   determining, based at least in part on the first indication of matching and the second indication of matching, whether the first chip terminal identifier corresponds to the first package terminal identifier; and
   outputting an indication of whether the first chip terminal identifier corresponds to the first package terminal identifier.

13. The method of claim 12, wherein the first matching algorithm comprises:
   matching the first chip terminal identifier and the first package terminal identifier by modifying at least one of the first chip terminal identifier and the first package terminal identifier; and
   determining a measure of the extent of such modification.

14. The method of claim 12, wherein the first matching algorithm comprises:
associating respective costs with text substitution, insertion and/or deletion;
matching at least one of the first chip terminal identifier and the first package terminal identifier by performing one or more text substitutions, insertions and/or deletions; and
accumulating costs associated with performed text substitutions, insertions and/or deletions.

15. The method of claim 12, wherein the second matching algorithm comprises:
identifying substrings of the first chip terminal identifier and the first package terminal identifier that match; and
determining a portion of the first chip terminal identifier and the first package terminal identifier that may be defined by the identified matching substrings.

16. The method of claim 12, wherein the second matching algorithm comprises:
utilizing a minimum common string partition algorithm to identify substrings of the first chip terminal identifier and the first package terminal identifier that match; and
determining a matching rate based, at least in part, on the identified substrings.

17. The method of claim 12, wherein:
the first matching algorithm comprises determining matching cost between the first chip terminal identifier and the first package terminal identifier utilizing dynamic programming with string manipulating; and
the second matching algorithm comprises determining matching rate between the first chip terminal identifier and the first package terminal identifier utilizing a greedy algorithm with minimum common string partitioning.

18. The method of claim 12, wherein determining whether the first chip terminal identifier corresponds to the first package terminal identifier comprises:
determining whether the first indication of matching indicates that the first package terminal identifier is the most likely match to the first chip terminal identifier;
determining whether the second indication of matching indicates that the first package terminal identifier is the most likely match to the first chip terminal identifier; and
if the first indication of matching and second indication of matching both indicate that the first package terminal identifier is the most likely match to the first chip terminal identifier, then determining that the first chip terminal identifier and the first package terminal identifier are a matching pair.

19. The method of claim 12, wherein determining whether the first chip terminal identifier corresponds to the first package terminal identifier comprises:
determining whether the first indication of matching indicates that the first package terminal identifier, of a plurality of package terminal identifiers, has the lowest matching cost with the first chip terminal identifier;
determining whether the second indication of matching indicates that the first package terminal identifier, of a plurality of package terminal identifiers, has the highest matching rate with the first chip terminal identifier; and
if the first and second indications of matching indicate that the first package terminal identifier and the first chip terminal identifier have the lowest matching cost and the highest matching rate, then determining that the first chip terminal identifier and the first package terminal identifier are a matching pair.

20. The method of claim 12, further comprising, if it is determined that the first string-matching algorithm and the second string-matching algorithm agree that the first chip terminal identifier corresponds to the first package terminal identifier, then outputting at least one indication that the first chip terminal identifier matches the first package terminal identifier.

21. The method of claim 12, further comprising, if it is determined that the first matching algorithm and second matching algorithm do not agree whether the first chip terminal identifier corresponds to the first package terminal identifier, then outputting an indication of at least one of: matching cost and matching rate for the first chip terminal identifier and the first package terminal identifier.

22. The method of claim 12, further comprising, if it is determined that the first matching algorithm and second matching algorithm do not agree whether the first chip terminal identifier corresponds to the first package terminal identifier, then outputting an indication identifying a most likely matching package terminal identifier for the first chip terminal identifier.

23. A method for matching integrated circuit chip terminals to package terminals, the method comprising:
receiving as input a first list of chip terminal identifiers and a second list of package terminal identifiers;
analyzing the first and second lists with at least a first string-matching algorithm to determine a set of matching pairs of chip terminals and package terminals; and
outputting a list of the set of matching pairs.

24. The method of claim 23, further comprising:
identifying a list of non-matched chip terminal identifiers and package terminal identifiers; and
outputting the list of non-matched chip terminal identifiers and package terminal identifiers.

25. The method of claim 23, further comprising:
identifying a list of non-matched chip terminal identifiers and package terminal identifiers;
determining recommended matching pairs from the list of non-matched chip terminal identifiers and package terminal identifiers; and
outputting information related to the recommended matching pairs.

* * * * *